(12) United States Patent
Burke

(10) Patent No.: US 12,603,358 B2
(45) Date of Patent: Apr. 14, 2026

(54) BATTERY HOUSING AND BATTERY SYSTEM COMPRISING SUCH A HOUSING

(71) Applicant: SAMSUNG SDI CO., LTD., Yongin-si (KR)

(72) Inventor: Thomas Burke, Ligist (AT)

(73) Assignee: Samsung SDI Co., Ltd., Yongin-si (KR)

( * ) Notice: Subject to any disclaimer, the term of this patent is extended or adjusted under 35 U.S.C. 154(b) by 751 days.

(21) Appl. No.: 17/941,740

(22) Filed: Sep. 9, 2022

(65) Prior Publication Data

US 2023/0078486 A1 Mar. 16, 2023

(30) Foreign Application Priority Data

Sep. 14, 2021 (EP) ..................................... 21196570
Sep. 7, 2022 (KR) ........................ 10-2022-0113681

(51) Int. Cl.
H01M 10/658 (2014.01)
H01M 10/613 (2014.01)
(Continued)

(52) U.S. Cl.
CPC ....... H01M 10/658 (2015.04); H01M 10/613 (2015.04); H01M 10/653 (2015.04);
(Continued)

(58) Field of Classification Search
CPC ............. H01M 10/658; H01M 10/613; H01M 10/653; H01M 10/6554; H01M 50/204; H01M 50/224; H01M 50/227; H01M 50/231; H01M 2220/20; H01M 10/625;

H01M 10/647; H01M 10/6556; H01M 50/209; H01M 50/222; H01M 50/249; H01M 50/293; H01M 50/24; Y02E 60/10
See application file for complete search history.

(56) References Cited

U.S. PATENT DOCUMENTS

| | | | |
|---|---|---|---|
| 9,446,643 B1 | 9/2016 | Vollmer | |
| 2016/0133896 A1* | 5/2016 | Baek ...................... | B60L 50/15 |
| | | | 429/72 |

(Continued)

FOREIGN PATENT DOCUMENTS

| | | |
|---|---|---|
| CN | 105591045 A | 5/2016 |
| CN | 206171566 U | 5/2017 |
| CN | 111640895 A | 9/2020 |

OTHER PUBLICATIONS

European Extended Search Report issued in corresponding application No. EP21196570.2 dated Feb. 16, 2022, 7 pages.
(Continued)

*Primary Examiner* — Lisa S Park
(74) *Attorney, Agent, or Firm* — Womble Bond Dickinson (US) LLP

(57) ABSTRACT

A battery housing accommodates a plurality of battery cells of a battery system and includes a housing frame. The housing frame has an interior space to accommodate a plurality of battery cells of a battery system. The housing frame includes side walls and a thermally insulating layer embedded in a plastic member. The plastic member includes an outer plastic layer covering an outer surface of the side walls and an inner plastic layer covering an inner surface of the side walls opposite the outer surface.

18 Claims, 3 Drawing Sheets

(51) Int. Cl.

| | |
|---|---|
| *H01M 10/653* | (2014.01) |
| *H01M 10/6554* | (2014.01) |
| *H01M 50/204* | (2021.01) |
| *H01M 50/224* | (2021.01) |
| *H01M 50/227* | (2021.01) |
| *H01M 50/231* | (2021.01) |

(52) U.S. Cl.

CPC ..... *H01M 10/6554* (2015.04); *H01M 50/204* (2021.01); *H01M 50/224* (2021.01); *H01M 50/227* (2021.01); *H01M 50/231* (2021.01); *H01M 2220/20* (2013.01)

(56) References Cited

U.S. PATENT DOCUMENTS

| | | | |
|---|---|---|---|
| 2021/0066686 A1 | 3/2021 | Siewert et al. | |
| 2021/0260850 A1* | 8/2021 | Jin .......................... | B32B 5/026 |

OTHER PUBLICATIONS

Chinese Office Action dated dated Oct. 1, 2025, issued in corresponding Chinese Patent Application No. 202211112248.8 (12 pages).

\* cited by examiner

BATTERY HOUSING AND BATTERY SYSTEM COMPRISING SUCH A HOUSING

CROSS-REFERENCE TO RELATED APPLICATION

This application claims priority to and the benefit of European Patent Application No. 21196570.2, filed in the European Patent Office on Sep. 14, 2021, and Korean Patent Application No. 10-2022-0113681, filed in the Korean Intellectual Property Office on Sep. 7, 2022, the entire content of both of which are incorporated herein by reference.

BACKGROUND

1. Field

Aspects of embodiments of the present disclosure relates to a battery housing and a battery system comprising such a housing.

2. Description of the Related Art

Recently, vehicles have been developed that use electric power as a source of motion. An electric vehicle is an automobile that is powered by an electric motor by using energy stored in rechargeable batteries. An electric vehicle may be solely powered by batteries or may be a hybrid vehicle powered by, for example, a gasoline generator. Furthermore, the vehicle (e.g., the hybrid vehicle) may include a combination of electric motor and conventional combustion engine. Generally, an electric-vehicle battery (EVB, or traction battery) is a battery used to power the propulsion of battery electric vehicles (BEVs). Electric-vehicle batteries differ from starting, lighting, and ignition batteries in that they are designed to provide power over sustained periods of time. A rechargeable (or secondary) battery differs from a primary battery in that it is designed to be repeatedly charged and discharged, while the latter is designed to provide only an irreversible conversion of chemical to electrical energy. Low-capacity rechargeable batteries are used as power supply for small electronic devices, such as cellular phones, notebook computers, and camcorders, while high-capacity rechargeable batteries are used as the power supply for hybrid vehicles and the like.

Rechargeable batteries may be used as a battery module formed of a plurality of unit battery cells coupled to each other in series and/or in parallel to provide high energy density, in particular, for motor driving of a hybrid vehicle. A battery module may be formed by interconnecting the electrode terminals of the plurality of unit battery cells in an arrangement based on a desired amount of power and to realize a high-power rechargeable battery. The cells can be connected in series, parallel, or in a mixture of both to deliver the desired voltage, capacity, or power density. Components of battery packs include the individual battery modules and the interconnects, which provide electrical conductivity between them.

The mechanical integration of such a battery pack, or more generally of a battery system, may require appropriate mechanical connections between the individual components, for example, of battery modules, and between them and a supporting structure of the vehicle. These connections should remain functional and safe throughout the average service life of the battery system. Further, installation space and interchangeability requirements must be considered, especially in mobile applications.

Mechanical integration of battery modules, or more generally of battery systems, may be achieved by providing a housing or a carrier framework and by positioning the battery modules, or more generally the battery system, thereon. Fixing the battery cells or battery modules may be achieved by using fitted depressions in the framework or by mechanical interconnectors, such as bolts or screws. In some cases, the battery modules may be confined by fastening side plates to lateral sides of the carrier framework. Further, cover plates may be fixed atop and below the battery modules.

The carrier framework of the battery pack, or more generally of the battery system, may be mounted to a carrying structure of the vehicle. In this case, the battery pack, or more generally the battery system, should be fixed at the bottom of the vehicle, and the mechanical connection may be established from the bottom side by, for example, bolts passing through the carrier framework of the battery pack. The framework is usually made of aluminum or an aluminum alloy to lower the total weight of the construction.

Battery systems according to the related art usually include a battery housing that acts as enclosure to seal the battery system against the environment and provides structural protection of the battery system components. Housed battery systems are usually mounted as a whole into their application environment, such as an electric vehicle. Thus, the replacement of defective system parts, such as a defect battery submodule, requires dismounting the whole battery system and removal of its housing first. Even defects of small and/or cheap system parts might then lead to dismounting and replacement of the complete battery system and its separate repair. Because high-capacity battery systems are expensive, large, and heavy, such a procedure is burdensome and the storage, for example, in the mechanic's workshop, of the bulky battery systems becomes difficult.

A housing for a battery system may be made from metal, plastic, or a combination thereof. Such battery housings act as an enclosure of the battery internals, including the battery cells, electrical contactors (or connectors), the cooling system, electronic supervision system, etc. Furthermore, such battery housings protect the battery system in the event of a crash and to facilitate robust fixation of the battery system components.

Plastic housings offer low part costs but have the disadvantage of rather low mechanical strength and low protection. With a metallic housing comes the risk of having a short circuit during crash, low thermal insulation, and rather high costs. Also, additional corrosion protection has to be implemented with a metallic housing. Additional electrical interfaces result in extra complexity in terms of battery sealing. A combination of a metallic and plastic housing has the disadvantage of insufficient thermal insulation.

SUMMARY OF INVENTION

According to embodiments of the present disclosure, at least some of the drawbacks of the prior art are overcome and a battery housing for a battery system is provided that has improved thermal insulation and allows integration of battery system components while maintaining mechanical robustness.

A battery housing for accommodating a plurality of battery cells of a battery system is provided. The battery housing includes a housing frame having an interior space configured to accommodate a plurality of battery cells of a battery system, and the housing frame includes side walls. The side walls are embedded in a plastic member including an outer plastic layer covering an outer surface of the side walls and an inner plastic layer covering an inner surface of the side walls opposite the outer surface. The battery housing further includes a thermally insulating layer embedded in the plastic member.

The battery housing may be a battery housing for 48V batteries, traction batteries for a hybrid electric vehicle (HEV), or a traction batteries for electric vehicles (EV). According to embodiments of the present disclosure, at least the side walls of the housing frame are embedded in the plastic member such that the plastic member encloses the side walls. A bottom wall and/or a top wall, such as a cap plate, of the housing frame may be embedded in the plastic member as well. According to embodiments of the present disclosure, not only the side walls of the housing frame but also a thermally insulating layer is embedded in the plastic member such that the plastic member also encloses the thermally insulating layer. Thus, the plastic member covers an inner surface and an outer surface of the thermally insulating layer. The plastic member may include a first layer covering the thermally insulating layer on a first side and a second layer covering the thermally insulating layer on a second side opposite the first side. The outer plastic layer and/or the inner plastic layer may have a thickness of about four to about eight times the thickness of the side walls of the housing frame. For example, the outer plastic layer and/or the inner plastic layer may have a thickness of about 8 mm and the side walls may have a thickness of about 1 mm.

The thermally insulating layer extends along the side walls, for example, in parallel with the side walls. A thermally insulating layer may also be provided for (or in) the top/bottom wall of the housing frame, and the thermally insulating layer and the top/bottom wall may be embedded in a plastic member as well. Thus, the whole housing frame may be embedded in a plastic member along with a thermally insulating layer so as to be protected from heat from all sides.

The thermally insulating layer protects the battery housing from elevated temperatures, which may damage the housing. The combined structure of the plastic member and the housing frame may fail at high temperatures, in particular at temperatures above about 1000° C. Such temperatures may result from a fuel fire, hot venting streams leaving the battery cells disposed in the housing in the event of a thermal runaway event, or from arcing between adjacent battery cells. The thermally insulating layer may, thus, be configured to resist temperatures of about 1000° C. and more. For example, the thermally insulating layer may be configured to resist temperatures of about 1000° C. and more for at least 5 minutes to protect the housing for at least such a time period. According to embodiments of the present disclosure, the thermally insulating layer is, however, not exposed to the outside or to the inside of the battery housing but is embedded in the plastic member. Thus, at least a part of the plastic member (e.g., at least a thin plastic layer) covers the thermally insulating layer with respect to the outside and/or the inside of the battery housing. The plastic member may keep the elements embedded therein in form, such as keeping the thermally insulating layer in a desired position relative to the housing frame. Such a hybrid structure of multiple materials is particularly persistent.

The plastic member may be connected, for example, directly connected, to the housing frame, for example, bonded. The plastic member may be connected to the frame by, for example, overmolding or spraying the housing frame with the plastic member material. The plastic member may form a coating. The plastic member may include thermosetting polymers. The plastic member may be formed by reaction injection molding (RIM) in which a curing reaction may be provided. The housing frame and the thermally insulating layer may be embedded into the same plastic member by using the RIM method.

Generally, the thermally insulating layer may be embedded in the outer plastic layer or in the inner plastic layer of the plastic member. Also, multiple thermally insulating layers may be provided, and at least one may be embedded in the outer plastic layer and at least one in the inner plastic layer. According to an embodiment, the thermally insulating layer is embedded in the outer plastic layer. Thus, the outer plastic layer encloses the thermally insulating layer such that a first layer of the outer plastic layer covers an outer side of the thermally insulating layer and a second layer of the outer plastic layer covers an inner side of the thermally insulating layer. The thermally insulating layer may be arranged near an outer periphery of the outer plastic layer so that all structural elements of the battery housing are arranged inward of the thermally insulating layer. The thermally insulating layer being embedded in the outer plastic layer allows for the thermally insulating layer to shield the housing frame and any further elements inward of the thermally insulating layer from heat coming from the outside, for example, due to a fuel fire after a crash. The thermally insulating layer being embedded in the inner plastic layer allows for the thermally insulating layer to shield the housing frame and any further elements outward of the thermally insulating layer from heat coming from the inside, for example, due to a thermal runaway event of the battery cells enclosed by the battery housing.

According to an embodiment, a first thermally insulating layer is embedded in the outer plastic layer and a second thermally insulating layer is embedded in the inner plastic layer. The first thermally insulating layer may be arranged near an outer periphery of the outer plastic layer and the second thermally insulating layer near an outer periphery of the inner plastic layer. Thus, the housing frame and any further elements arranged in between the two thermally insulating layers may be shielded against heat from the inside, for example, due to a thermal runaway of the enclosed battery cells, and against heat from the outside, for example, due to because of a fuel fire after a crash.

According to an embodiment, the battery housing includes structural elements embedded in the plastic member as well. The structural elements may be such further elements that are shielded by the thermally insulating layer(s) along with the housing frame mentioned above. The structural elements may be part of the housing frame. Such structural elements may contribute to (e.g., may increase or improve) the stability of the battery housing and are shielded by the thermally insulating layer as well. According to an embodiment, the structural elements are embedded in the outer plastic layer. For example, the structural elements may be arranged between the thermally insulating layer and the side walls of the housing frame, with the thermally insulating layer being arranged in the outer plastic layer as well. This way, the thermally insulating layer may shield the structural elements and the side walls from heat coming from the outside.

According to an embodiment, the side wall is a metallic wall. For example, the side wall may be made of steel or aluminum. The side wall and the plastic member may form a combination of a metallic and plastic housing frame. The plastic member may provide additional stability so that the housing frame can have a lesser thickness than housing frames without such plastic members. This may reduce costs as the metallic material is usually more expensive than the material of the plastic member. The plastic member, in such an embodiment, also acts as electrical insulation to shield the electrically conducting housing frame from the battery cells and/or from the outside.

According to an embodiment, the plastic member includes a plastic foam, such as a polyurethane (PU) foam. In some embodiments, the plastic member may consist of such a foam. The plastic foam may be applied via, for example, Reaction Injection Molding (RIM) to encompass the housing frame and the thermally insulating layer. The plastic foam may be cured after having been applied to assume a higher density and, thus, stability.

According to an embodiment, the thermally insulating layer includes a fabric. The fabric may include or consist of ceramic and/or glass fibers. For example, the thermally insulating layer may include a fabric and a resin, with the fabric in combination with the resin forming the thermally insulating layer after curing. Such a thermally insulating layer may be particularly heat resistant, including being heat resistant up to about 1000° C. and more.

According to an embodiment, the battery housing includes a cap plate as a top wall of the housing frame, and the top wall may be embedded in a plastic member along with a thermally insulating layer. Thus, the cap plate, as part of the housing frame, may also be embedded in a plastic member along with a thermally insulating layer so that the thermally insulating layer may shield the cap plate from heat coming from the inside and/or outside of the battery housing depending on the arrangement of the thermally insulating layer. For example, the thermally insulating layer may be arranged inwards of the top wall/cap plate to protect against a thermal runaway of the enclosed battery cells.

According to an embodiment, the battery housing includes (or has) an air layer arranged adjacent the thermally insulating layer between the thermally insulating layer and the side walls, for example, in direct contact with the thermally insulating layer. Such an air layer may further enhance thermal insulation. Such an air layer may be provided in a factory setting of the battery housing or may be formed later. For example, such an air layer may form due to the thermally insulating layer being subjected to sufficient heat. Thus, according to an embodiment, the thermally insulating layer may be configured to form an air layer when exposed to sufficient heat. For example, the thermally insulating layer may be configured to expand when exposed to sufficient heat (e.g., when a reference or predetermined temperature is reached or exceeded). Also, the thermally insulating layer may be configured to detach from the plastic member in such a case thereby forming an air layer within the plastic member. This may be provided by the thermally insulating layer including a fabric as explained above.

According to an embodiment, the plastic member also acts as an electrical insulation. This may be provided when the plastic member includes or consists of a plastic material, which is electrically insulating, for example, polyurethane foam. This way, the housing frame may be shielded against electrical currents from the outside and/or inside, including from the battery cells. This is useful if the housing frame is a metallic one or includes metal.

The present disclosure also provides a battery system including a battery housing as described above and a plurality of battery cells accommodated in the battery housing. The battery cells are arranged in the interior space of the housing frame. The battery cells may stand on (e.g., may contact) a bottom wall of the housing frame. For example, the battery cells may contact a cooling plate arranged at a bottom of the housing frame or forming the bottom of the housing frame. The cooling plate may be part of the battery housing.

The present disclosure also provides an electrical vehicle including a battery system as described above. The electric vehicle may be an HEV or EV. The battery system may be a traction battery of the electric vehicle.

Further aspects and features of the present disclosure can be learned from the dependent claims and/or the following description.

BRIEF DESCRIPTION OF THE DRAWINGS

Aspects and features of the present disclosure will become apparent to those of ordinary skill in the art by describing, in detail, embodiments with reference to the attached drawings, in which.

DETAILED DESCRIPTION

Figure 1:
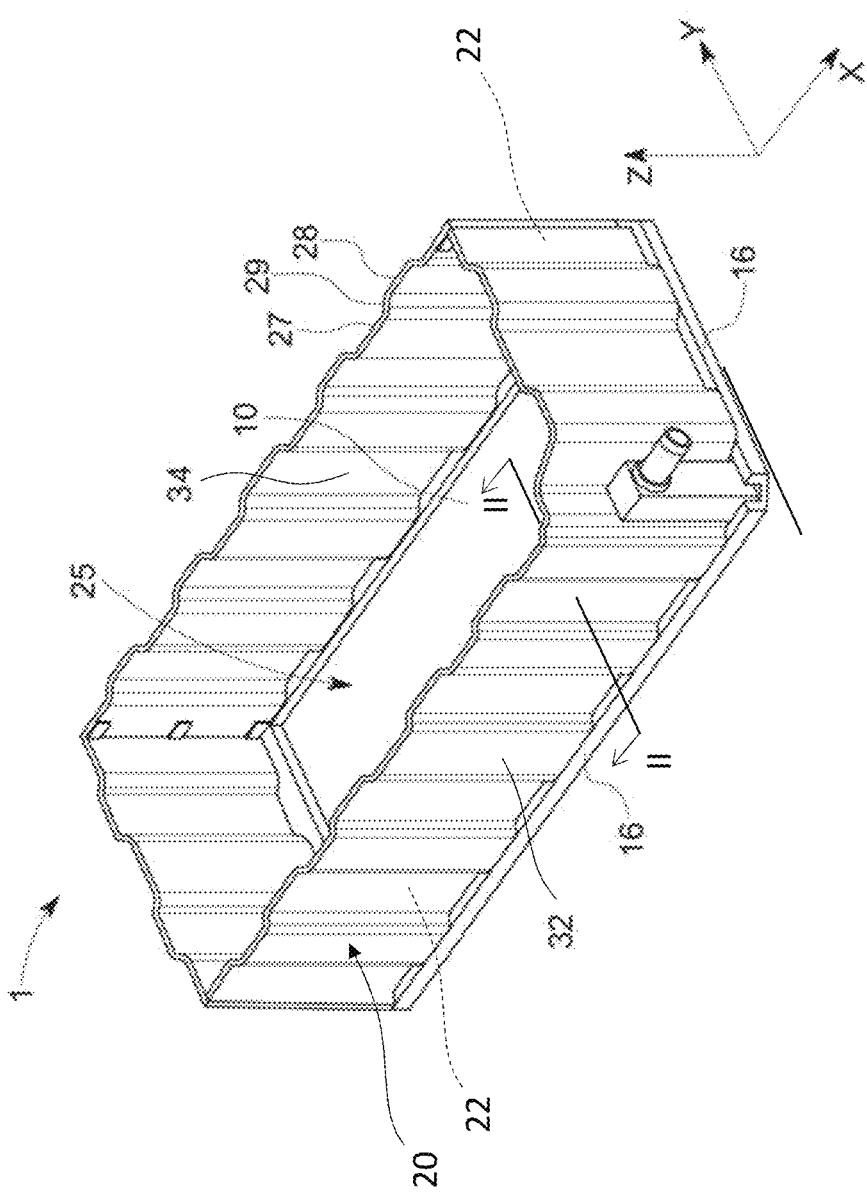
FIG. 1 is a perspective view of a battery housing according to an embodiment of the present disclosure.

Reference will now be made, in detail, to embodiments, examples of which are illustrated in the accompanying drawings. Aspects and features of the embodiments, and implementation methods thereof, will be described with reference to the accompanying drawings. In the drawings, like reference numerals denote like elements, and redundant descriptions are omitted. As used herein, the term "and/or" includes any and all combinations of one or more of the associated listed items.

In the following description of embodiments of the present disclosure, the terms of a singular form may include plural forms unless the context clearly indicates otherwise. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be further understood that the terms "have," "include," "comprise," "having," "including," or "comprising" specify a property, a region, a fixed number, a step, a process, an element, a component, and a combination thereof but do not exclude other properties, regions, fixed numbers, steps, processes, elements, components, and combinations thereof.

Aspects and features of the present disclosure, and methods of accomplishing the same, may be understood more readily by reference to the following detailed description of embodiments and the accompanying drawings. The present disclosure, however, may be embodied in various different forms and should not be construed as being limited to the embodiments illustrated herein. Rather, these embodiments are provided as examples so that this disclosure will be thorough and complete and will fully convey the aspects and features of the present disclosure to those skilled in the art. Accordingly, processes, elements, and techniques that are not necessary to those having ordinary skill in the art for a complete understanding of the aspects and features of the present disclosure may not be described.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or coating is referred to as being "on," "connected to," or "coupled to" another element or coating, it can be directly on, connected to, or coupled to the other element or coating or one or more intervening elements or coatings may be present. In addition, it will also be understood that when an element or coating is referred to as being "between" two elements or coatings, it can be the only element or coating between the two elements or coatings, or one or more intervening elements or coatings may also be present.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

In FIG. 1, a battery housing 1 according to an embodiment of the present disclosure is shown. The battery housing 1 includes a housing frame 20 having an interior space 25 configured to accommodate a plurality of battery cells of a battery system. The housing frame 20 has a rectangular shape and includes four side walls 22, each embedded in a plastic member 30 including an outer plastic layer 32 covering an outer surface of the side walls 22 and an inner plastic layer 34 covering an inner surface of the side walls 22 opposite the outer surface (see, e.g., FIG. 2).

The side walls 22 of the housing frame 20 may have a plurality of alternatively arranged indented parts 27 and protruding parts 28 as shown in, for example, FIG. 1. The indented parts 27 and protruding parts 28 may be smoothly connected by connecting parts 29, for example, curved parts. In other embodiments, the side walls 22 of the housing frame 20 may be flat (see, e.g., FIG. 3). A cooling plate 16 is arranged at a bottom 10 of the housing frame 20 for cooling the battery cells to be arranged on the cooling plate 16. The cooling plate 16 may form a bottom wall of the housing frame 20 (see, e.g., FIG. 1). In other embodiments, the cooling plate 16 may be arranged above a bottom wall 21 of housing frame 20 (see, e.g., FIG. 3).

Figure 2:
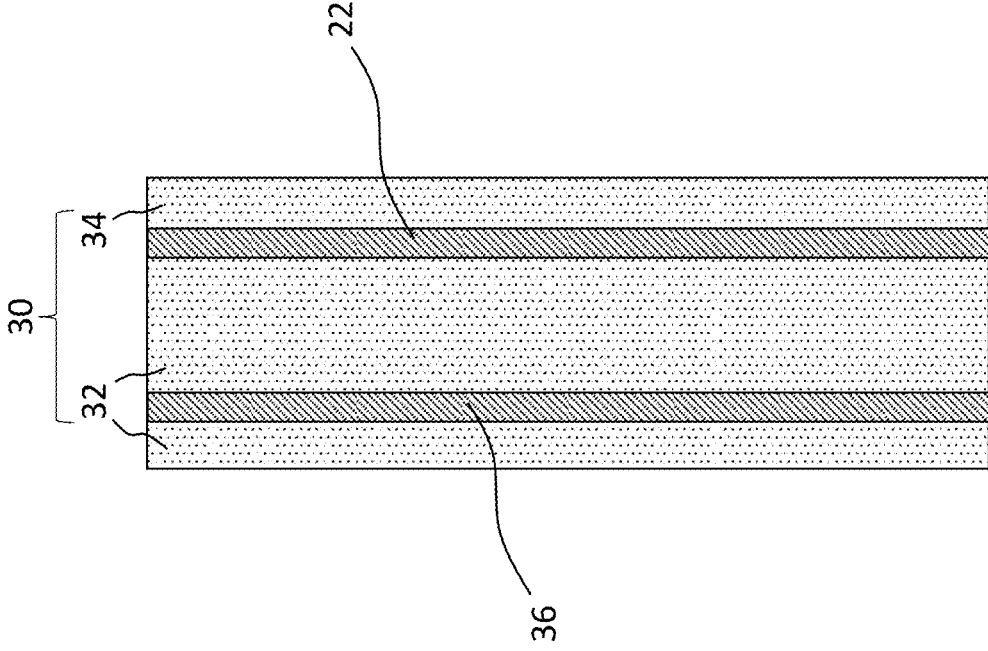
FIG. 2 is a cross-sectional view taken along the line II-II of FIG. 1.
Figure 3:
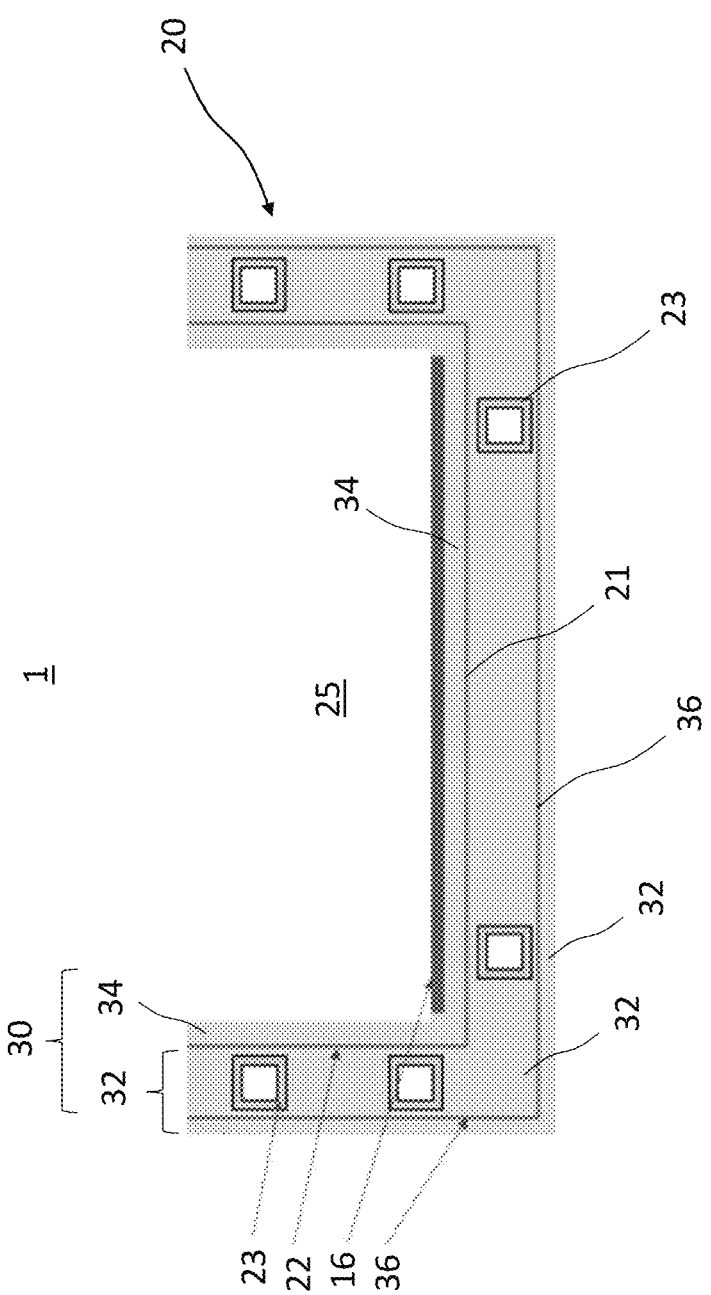
FIG. 3 is a partial cross sectional view of a battery housing according to an embodiment of the present disclosure.

As can be seen in FIGS. 2 and 3, the battery housing 1 further includes a thermally insulating layer 36, which is also embedded in the plastic member 30. In one embodiment, the thermally insulating layer 36 is embedded in the outer plastic layer 32. The battery housing 1, as shown in FIG. 3, also includes multiple structural elements 23, which are embedded in the outer plastic layer 32 as well. The structural elements 23 may provide further stability to the battery housing 1, but they are optional and may be omitted in some embodiments.

The thermally insulating layer 36 is arranged at a periphery of the outer plastic layer 32 but is covered by the outer plastic layer 32 with respect to the outside (e.g., is not exposed to the outside through the outer plastic layer 32). The thermally insulating layer 36 includes a fabric of ceramic and/or glass fibers, which are preferably cured in a resin. The thermally insulating layer 36 shields the side walls 22 and the structural elements 23 from heat coming from outside of the battery housing 1, for example, due to a fire resulting from a crash of an electric vehicles (EV) including the battery housing 1 as part of its battery system. Any battery cells arranged in the interior space 25 is, thus, protected from such heat.

As can be seen in FIG. 3, the bottom wall 21, along with the side walls 22, are embedded in the outer plastic layer 32 along with the thermally insulating layer 36, which extends along the bottom of the housing frame 20. Thus, the bottom wall 21 of the housing frame 20 is shielded (e.g., is shielded from heat) as well.

A further thermally insulating layer may be embedded in the inner plastic layer 34 (e.g., inwards of the side walls 22 and the structural elements 23) to protect the side walls 22 and the structural elements 23 from heat coming from the inside of the battery housing 1, for example, due to a thermal runaway event in one or more of the battery cells.

Moreover, the battery housing 1 may further comprise a cap plate as a top wall of the housing frame 20, the cap plate being embedded in the plastic member along with a thermally insulating layer. Furthermore, the battery housing 1 may comprise an air layer arranged adjacent the thermally insulating layer 36 between the thermally insulating layer 36 and the side walls 22. For example, the thermally insulating layer 36 may be adapted to form such an air layer when subjected to sufficient heat.

Thus, the thermally insulating layer increases the safety of the battery housing/system. The thermally insulating layer may withstand temperatures of about 1000° C. or more for at least 5 minutes. The thermally insulating layer being embedded in the plastic member, allowing for a particularly stable and persistent (or resilient) structure. The battery housing can be manufactured via reaction injection molding (RIM) of the plastic material that the plastic member is comprised of, such as a polyurethane (PU) foam, such that the housing frame and the thermally insulating layer as well as the structural elements are embedded in the plastic member.

SOME REFERENCE NUMERALS 1 battery housing
10 bottom of housing frame
16 cooling plate
20 housing frame
21 bottom wall
22 side walls
23 structural elements
25 interior space
27 indented parts
28 protruding parts

29 connecting parts
30 plastic member
32 outer plastic layer
34 inner plastic layer
36 thermally insulating layer

The invention claimed is:

1. A battery housing for accommodating a plurality of battery cells of a battery system, the battery housing comprising:
   a housing frame having an interior space configured to accommodate the plurality of battery cells of the battery system, the housing frame comprising:
      side walls embedded in a plastic member, the plastic member comprising an outer plastic layer covering an outer surface of the side walls and an inner plastic layer covering an inner surface of the side walls opposite the outer surface;
      a thermally insulating layer embedded in the plastic member; and
      a cap plate as a top wall of the of the housing frame, the cap plate being embedded in the plastic member along with the thermally insulating layer.

2. The battery housing of claim 1, wherein the thermally insulating layer is embedded in the outer plastic layer.

3. The battery housing of claim 2, wherein the thermally insulating layer is near an outer periphery of the outer plastic layer.

4. The battery housing of claim 1, wherein the thermally insulating layer comprises a first thermally insulating layer and a second thermally insulating layer,
   wherein the first thermally insulating layer is embedded in the outer plastic layer, and
   wherein the second thermally insulating layer is embedded in the inner plastic layer.

5. The battery housing of claim 1, wherein the battery housing further comprises structural elements embedded in the plastic member.

6. The battery housing of claim 5, wherein the structural elements are embedded in the outer plastic layer.

7. The battery housing of claim 6, wherein the structural elements are between the thermally insulating layer and a corresponding one of the side walls of the housing frame.

8. The battery housing of claim 1, wherein the side walls are metallic side walls.

9. The battery housing of claim 8, wherein the metallic side walls are made of steel or aluminum.

10. The battery housing of claim 1, wherein the plastic member comprises polyurethane foam.

11. The battery housing of claim 1, wherein the thermally insulating layer comprises a fabric.

12. The battery housing of claim 11, wherein the fabric comprises ceramic and/or glass fibers.

13. The battery housing of claim 1, wherein the battery housing further comprises an air layer between the thermally insulating layer and the side walls.

14. The battery housing of claim 13, wherein the thermally insulating layer is configured to form the air layer when heated.

15. The battery housing of claim 1, wherein the thermally insulating layer is electrically insulative.

16. A battery system comprising the battery housing according to claim 1 and comprising a plurality of battery cells accommodated in the battery housing.

17. The battery system of claim 16, wherein the battery cells contact a cooling plate.

18. An electrical vehicle comprising the battery system according to claim 16.

* * * * *